US012675263B2

(12) United States Patent
Mair et al.

(10) Patent No.: US 12,675,263 B2
(45) Date of Patent: Jul. 7, 2026

(54) METHOD FOR GENERATING SOURCE CODE

(71) Applicant: dSPACE GmbH, Paderborn (DE)

(72) Inventors: Michael Mair, Paderborn (DE); Florian Gayk, Paderborn (DE)

(73) Assignee: DSPACE GMBH, Paderborn (DE)

( * ) Notice: Subject to any disclaimer, the term of this patent is extended or adjusted under 35 U.S.C. 154(b) by 258 days.

(21) Appl. No.: 18/067,738

(22) Filed: Dec. 19, 2022

(65) Prior Publication Data

US 2024/0201965 A1      Jun. 20, 2024

(51) Int. Cl.
*G06F 8/40* (2018.01)
*G06F 8/30* (2018.01)

(52) U.S. Cl.
CPC . *G06F 8/40* (2013.01); *G06F 8/30* (2013.01)

(58) Field of Classification Search
CPC ..................................... G06F 8/40; G06F 8/30
USPC .......................................................... 717/107
See application file for complete search history.

(56) References Cited

U.S. PATENT DOCUMENTS

| | | | | |
|---|---|---|---|---|
| 7,178,112 | B1 * | 2/2007 | Ciolfi | G06F 30/3323 703/2 |
| 8,180,964 | B1 * | 5/2012 | Koh | G06F 11/3442 711/118 |
| 9,793,965 | B1 * | 10/2017 | Pustovalov | H04B 7/0452 |
| 10,078,500 | B2 | 9/2018 | Moors et al. | |
| 10,853,076 | B2 * | 12/2020 | Bouzguarrou | G06F 9/3806 |
| 2007/0169039 | A1 * | 7/2007 | Lin | G06F 8/34 717/146 |
| 2009/0083314 | A1 * | 3/2009 | Maim | G06F 40/194 |
| 2010/0228935 | A1 * | 9/2010 | Fienblit | G06F 16/119 711/E12.103 |
| 2019/0042982 | A1 * | 2/2019 | Qu | G06N 20/00 |
| 2019/0156185 | A1 * | 5/2019 | Li | G06N 3/082 |
| 2020/0304438 | A1 * | 9/2020 | Kozloski | H04L 51/08 |
| 2021/0041596 | A1 * | 2/2021 | Kushwaha | G01V 1/306 |
| 2022/0012309 | A1 * | 1/2022 | Shachar | G06N 3/084 |
| 2023/0106474 | A1 * | 4/2023 | Ghosh | G06N 20/00 706/12 |

FOREIGN PATENT DOCUMENTS

EP          2418577 A1      2/2012

* cited by examiner

*Primary Examiner* — Bradford F Wheaton
(74) *Attorney, Agent, or Firm* — LEYDIG, VOIT & MAYER, LTD.

(57) ABSTRACT

A block diagram includes at least three blocks, including a source block emitting a first composite signal, a passing block receiving the first composite signal and emitting a second composite signal with the same dimensions, and a filter block receiving the second composite signal and discarding at least one component of the second composite signal. A method for generating source code from one or more blocks of the block diagram includes: transforming the block diagram into an intermediate representation, including transforming the at least three blocks; applying at least one optimization to the intermediate representation, including determining whether a memory condition is fulfilled; based on the memory condition being fulfilled, replacing an output variable of the passing block with an auxiliary variable of smaller dimension; and translating the optimized intermediate representation into source code.

11 Claims, 3 Drawing Sheets

PC

OS

TCE

| MOD | SIM | PCG |
|-----|-----|-----|

| BIB | MAT | DDT |
|-----|-----|-----|

| COM | LIN |
|-----|-----|

METHOD FOR GENERATING SOURCE CODE

FIELD

The invention relates to generating executable code from a block diagram, in particular for programming control units.

BACKGROUND

Control devices are used in many different applications in order to record physical variables of a process and/or influence a process using connected actuators, for example an anti-lock control in a braking operation. The time constants determining the dynamic behavior of the process often require cycle times of 1 ms or less, so the control unit must have real-time capabilities. For reasons of cost, control units often include microcontrollers having a small memory and limited computing power, which is why the size and efficiency of the executable code is very important.

To design control units more quickly, control strategies are often developed on the basis of models in a computing environment such as MATLAB/Simulink. Therefore, the process and/or the controller, or the behavior of the control unit in general, can be simulated first and it can be checked whether desired properties are present. In particular, the models may be block diagrams comprising blocks that execute operations such as calculations; by way of example, a block may calculate one output signal from a plurality of input signals. In general, block diagrams are executed cyclically, with all blocks being permanently retained in the memory and each block being executed once per time step. In particular, in each time step a block may apply one or more operations to input signals from the parent block in order to generate output signals for the current step. Block diagrams may additionally comprise a sub-model for describing a discrete behavior in which a number of states and transition conditions are defined. Source code for programming the control unit can be generated from the models using a code generator. A code generator for generating source code in production quality is known, for example, from the document "Production Quality Code Generation from Simulink Block Diagrams", Proceedings of the 1999 International Symposium on Computer Aided Control System Design, Kohala Coast, Hawaii, H. Hanselmann et al.

When models are described in the form of a block diagram, with blocks being linked to exchange data or relay signals via directional links or signal links, a normal code generation approach involves generating one output variable in the source code for each output of a block. However, the drawback of this is that generally more block variables than are actually needed are initially produced in the process. The number of block variables, or the code size in general, can be reduced by subsequent optimization. For instance, EP 2418577 A1 describes transforming a block diagram into an intermediate representation and applying at least one optimization to said intermediate representation in order to generate an optimized intermediate representation. Many different further optimizations known per se from compiler construction can be successively applied in order to generate intermediate representations that are optimized further. Next, source code such as C code is generated from the optimized intermediate representation.

Since each optimization results in a different intermediate representation, the degree to which the code is optimized overall may depend on the order of the optimization steps.

In the case of multi-component variables, such as a structure or a vector, optimization weaknesses are particularly severe, as even simple copying may be accompanied by high memory consumption and a considerable execution time. When writing to a flash memory having a limited number of possible writing operations, U.S. Ser. No. 10/078,500 B2 proposes testing whether, owing to an assignment operation, a block group results in a value change only for portions of a multi-component variable, and then generating writing instructions only for the individual elements affected. However, the execution time for checking whether a value change occurred is only acceptable when writing to a medium that is slow and/or prone to wear.

SUMMARY

In an exemplary embodiment, the present invention provides a method for generating source code from one or more blocks of a block diagram that comprises at least three blocks. The at least three blocks include a source block emitting a first composite signal corresponding to a multi-component variable, a passing block receiving the first composite signal and emitting a second composite signal with the same dimensions, and a filter block receiving the second composite signal and discarding at least one component of the second composite signal. The method includes: transforming the block diagram into an intermediate representation, wherein transforming the block diagram into the intermediate representation comprises transforming the at least three blocks; applying at least one optimization to the intermediate representation, wherein applying the at least one optimization comprises determining whether a memory condition is fulfilled; based on the memory condition being fulfilled, replacing an output variable of the passing block with one or more auxiliary variables of smaller dimension; and translating the optimized intermediate representation into source code.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1, 2:
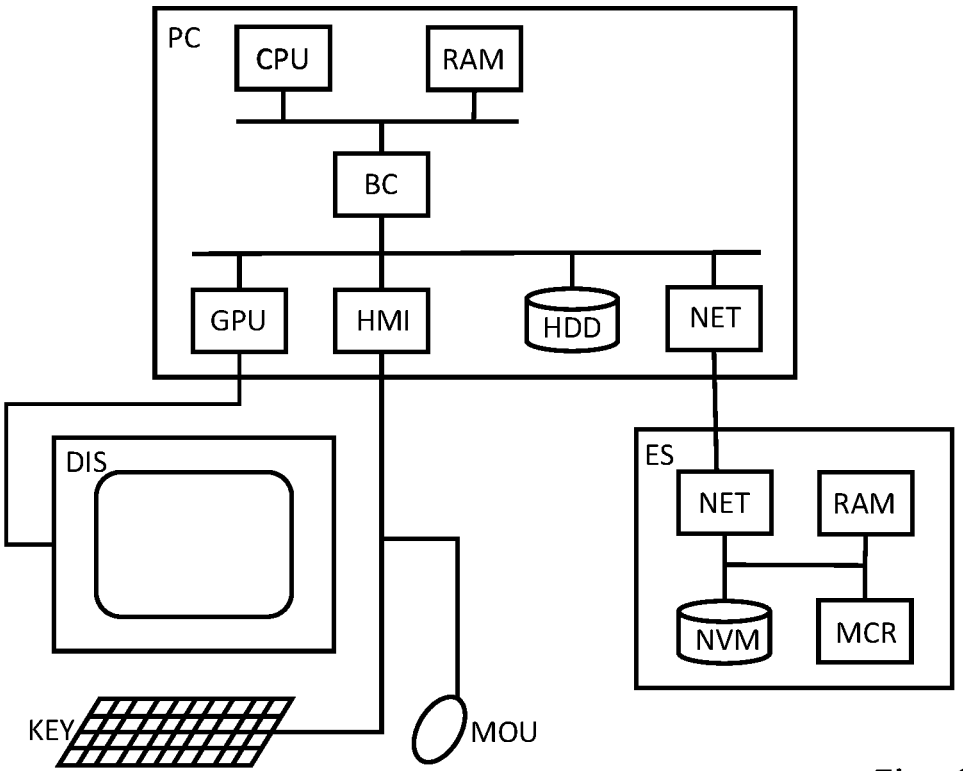
FIG. 1 shows a preferred embodiment of a computer system.
FIG. 2 is a schematic illustration of software components that are preferably present in a computer system.

Exemplary embodiments of the present invention provide for improved optimization in a plurality of cases where only a part of a multi-component variable is selected and further processed and/or written in memory.

Exemplary embodiments of the present invention aid the generation of more efficient source code from block diagrams where selective processing and/or writing of parts of a multi-component variable occurs.

In an exemplary embodiment, a method is provided for generating source code from one or more blocks of a block diagram that comprises at least three blocks, a source block emitting a first composite signal corresponding a multi-component variable, a passing block receiving the first composite signal and emitting a second composite signal with the same dimensions, as well as a filter block receiving the second composite signal, wherein the filter block discards at least one component of the second composite signal. The method comprises transforming the block diagram into an intermediate representation, wherein transforming the block diagram into the intermediate representation comprises transforming the at least three blocks; applying at least one optimization to the intermediate representation, wherein applying the at least one optimization comprises determining whether a memory condition is fulfilled, and replacing an output variable of the passing block with one or more auxiliary variables of smaller dimension provided the memory condition is fulfilled; and translating the optimized intermediate representation into source code.

The dimension of a signal can be determined by the bit width and/or data type of a variable corresponding to the signal. As an example, the dimension can be indicated by the number of bytes the multi-component variable corresponding to the signal occupies. For a composite signal or the corresponding multi-component variable, the number of elements of a given data type times the bit width of the data type can be summed for all elements and given data types to determine the dimension. The multi-component variable may be a vector comprising a multiplicity of variables of the same data type, a matrix comprising a multiplicity of vectors, a structure comprising a multiplicity of variables of any data type, or a vector or matrix of structures.

Advantageously, a method according to an embodiment of the invention identifies code pattern involving a multi-component variable being processed as a whole, and subsequently being partially discarded. The filtering is then applied at the blocks upstream of the filter block by introducing auxiliary variables of smaller dimensions. This allows for reducing memory consumption while considering code readability, code size and execution speed. By determining whether a memory condition is fulfilled, the optimization can be adapted to the user's needs. Different memory conditions may be selected/imposed. For instance, the memory condition may be fulfilled as soon as at least one component of the multi-component variable is discarded. Or the memory condition may only be fulfilled in case of a certain minimum memory saving, e.g. a predetermined number of bytes. For components of the multi-component variable that comprise subcomponents, the memory condition can be checked for the component and for the subcomponents. If a replacement of the component would not fulfill the memory condition, replacing the subcomponents by auxiliary variables can be used to reduce the number of assignment operations. Thus, the multi-component variable can be replaced by one auxiliary variable for the remaining component or a plurality of smaller auxiliary variables for the remaining subcomponents. If two or more separate components remain, the multi-component variable can be replaced by a single auxiliary variable comprising multiple components or the multi-component variable can be replaced by multiple auxiliary variables corresponding to the remaining components. Fulfillment of the memory condition can be determined by adding the dimension of all auxiliary variables replacing the multi-component variable.

In an embodiment, the first composite signal is a bus and/or the multi-component variable is a structure comprising multiple components of different data type and/or the multi-component variable is a vector comprising multiple components of the same data type. Optimization according to the invention is applicable both to busses, the corresponding structure variables, and to vector signals, as well as corresponding vector or matrix variables.

In an embodiment, the passing block is a selection block receiving the first composite signal and a third composite signal of the same dimension, wherein the selection block transmits either the first composite signal or the third composite signal, or the passing block is a calculation block that performs elementwise calculation on the first composite signal, such as adding a value or multiplying by a factor, or the passing block is a delay block that emits received signals after one or more periods. The method is applicable to different passing blocks that operate on components of the signal without changing the dimension.

In an embodiment, applying the at least one optimization further comprises replacing the output variable of at least one block directly upstream of the passing block with an auxiliary variable of smaller dimension provided the memory condition is fulfilled. By replacing an output variable of a direct predecessor of the passing block, the memory consumption can be further reduced.

In an embodiment, the memory condition is fulfilled if the at least one component discarded in the filter block is of bigger dimension than a predefined threshold and/or the dimension of the remaining components emitted by the filter block is lower than a predefined threshold. Comparing the dimension of the discarded component/s or the remaining component/s with a predefined threshold ensures that replacing an output variable of the passing block by the auxiliary variable is performed only when that allows for a significant reduction in memory usage. By adapting the predefined threshold, a user may determine which reduction is considered significant. The threshold may be defined relative to the dimension of the multi-component variable. For instance, one or more of the following predefined threshold values could be used:

If the threshold value is zero, no optimization is performed.

If the threshold value is one or higher, replacement by exactly one scalar (numerical or substruct) auxiliary takes place independently of the relative memory consumption.

If the threshold value is in the range [2, 99], then optimization takes also place if the total memory consumption of the auxiliary variables is less than the (threshold value) percentage of the struct variable's memory consumption.

If the threshold value is 100, then replacement by auxiliary variables always takes place if at least one leaf component is unused (and removable).

The threshold could also be predefined dynamically; for instance, the memory condition could be fulfilled if the at least one component discarded in the filter block is of bigger dimension than the remaining components that the filter block emits.

In an embodiment, when the memory condition is not fulfilled, the method further comprises determining whether a cost condition is fulfilled, and replacing an assignment of the entire multi-component variable by a partial assignment pertaining to one or more components of the multi-component variable provided the cost condition is fulfilled. By splitting up an assignment of an entire multicomponent variable into one or more partial assignments that pertain to components or elements of components, the code size can be reduced and/or the execution speed can be improved while also improving readability. Further, it facilitates detecting unnecessary components and thus allows for subsequent optimizations including a later removal of one or more unnecessary components from the multi-component data type.

In an embodiment, the cost condition is fulfilled if the execution time for the partial assignment is lower than a predefined threshold. The execution cost may be estimated by a number of loop iterations required for completing the partial assignment. This condition takes into account that assignment of an entire multi-component variable may be performed via more efficient instructions, such as one copy of the whole memory area corresponding to the multi-component variable instead of a plurality of successive element assignments.

In an embodiment, replacing an assignment of the entire multi-component variable by a partial assignment pertaining to one or more components of the multi-component variable further comprises replacing an assignment of the entire multi-component variable by a partial assignment pertaining to one or more components of the multi-component variable of at least one block directly upstream of the passing block. This allows for improving code size and/or execution speed and readability even further.

The invention further relates to a method for configuring a control unit, wherein the control unit comprises at least one arithmetic logic unit and preferably at least one sensor and/or at least one actuator in order to record data on a physical process and/or influence said process, the method comprising the steps of:

a. inputting a block diagram,
    b. generating source code using a method according to the invention,
    c. compiling the source code for the arithmetic logic unit such that an executable code is generated,
    d. transmitting the executable code to the control unit, and
    e. storing the executable code on a non-volatile memory of the control unit and/or executing the executable code by the arithmetic logic unit of the control unit.

The invention further relates to a computer program product comprising a computer-readable storage medium having commands embedded therein which, when executed by a processor, cause the processor to be configured to carry out a method according to the invention.

The invention furthermore relates to a computer system comprising a human-machine interface, a non-volatile memory, and a processor, wherein the processor is configured to carry out a method according to the invention.

The invention will now be described in more detail with reference to the drawings, in which like parts are designated by the same reference signs. The illustrated embodiments are highly schematic, i.e., the distances and the lateral and vertical dimensions are not true to scale and, unless indicated otherwise, do not have any derivable geometric relationships to each other either.

FIG. 1 shows an example configuration of a computer system PC. The computer system has a processor CPU, which may in particular be implemented as a multi-core processor, a main memory RAM, and a bus controller BC. The computer system PC is preferably configured to be manually operated directly by a user, a monitor DIS being connected via a graphics card GPU, and a keyboard KEY and a mouse MOU being connected via a peripheral interface HMI. In principle, the human-machine interface of the computer system PC could also be configured as a touch interface. The computer system further comprises a non-volatile data store HDD, which may in particular be configured as a hard disk and/or solid-state disk, as well as an interface NET, in particular a network interface. A control unit ES may be connected via the interface NET. In principle, one or more interfaces of any type, in particular wired interfaces, may be provided on the computer system PC and may each be used for connecting to a control unit ES. Expediently, a network interface in accordance with the Ethernet standard may be used; the interface NET may also be wireless, in particular configured as a WLAN interface or in accordance with a standard such as Bluetooth.

The control unit ES may be configured as a series control unit or as an evaluation board for a target platform. Expediently, it comprises an interface NET for connecting a microcontroller MCR, having a different architecture from the processor of the computer system, and a main memory RAM and a non-volatile memory NVM to the computer system PC. Where the control unit ES is present, a processor-in-the-loop simulation of the generated code may preferably take place.

FIG. 2 shows a diagram of the software components that are preferably installed on the computer system PC. These software components use mechanisms of the operating system OS to, for example, access the non-volatile memory HDD or to establish a connection to an external computer via the network interface NET.

A technical computing environment TCE allows models to be created and source code to be generated from the models. In a modeling environment MOD, models of a dynamic system may be created, preferably via a graphical user interface. In particular, these may be block diagrams comprising a plurality of blocks and describing the behavior over time and/or internal states of a dynamic system. At least some of the blocks are linked via signals, i.e., directional links for exchanging data, which may be scalar or composite. Blocks may be atomic, i.e., may, from the perspective of the surrounding blocks, form a unit in which all the input signals have to be applied at the start of a computing step and all the output signals have to be present at the end of a computing step. If block diagrams are hierarchical, a multiplicity of blocks in a subordinate plane may describe the construction of a block in a superordinate plane. Hierarchical or composite blocks may comprise a multiplicity of blocks in a subordinate plane, even if said blocks are atomic. In particular, composite blocks may be sub-systems; sub-systems may have additional properties, such as implementation in a separate function and/or triggering of the execution of the sub-system via a dedicated signal. Special blocks may be arranged in sub-systems to further specify the properties of the sub-system. The computing environment TCE comprises one or more libraries BIB from which blocks or modules for building a model may be selected. In a script environment MAT, instructions may be input interactively or via a batch file in order to perform calculations or modify the model. The computing environment TCE further comprises a simulation environment SIM that is configured to interpret or execute the block diagram in order to examine the behavior of the system over time. These calculations are preferably carried out using high-precision floating-point numbers on one or more cores of the microprocessor CPU of the computer system.

Preferably, source code may be generated in a programming language such as C from a created model using a code generator PCG. Additional information on the model, in particular on the block variables, is expediently stored in a definition data pool DDT. Expediently, value ranges and/or scales are allocated to the block variables to assist with the calculation of the model using fixed-point instructions. Desired properties of the source code, for example conformity with a standard such as MISRA, may also be set or stored in the definition data pool DDT. Expediently, each block variable is allocated to a predetermined variable type, and one or more desired properties are set, for example the allowability of optimizations such as merging variables. The code generator PCG preferably analyzes the settings of the definition data pool DDT and takes them into account when generating the source code. The definition data pool DDT may have a tree structure or be stored as a simple file in a memory of the computer system; alternatively, the definition data may be stored in a dedicated database system. The definition data pool may have a program interface and/or import/export functions.

The computer system PC has a compiler COM and a linker LIN, which expediently are configured to generate binary files that can be executed on a control unit ES and/or the computer system PC. In principle, a multiplicity of compilers may be provided, in particular cross-compilers for different target platforms in order to assist control units or evaluation boards ES having different processor architectures.

Figure 3:
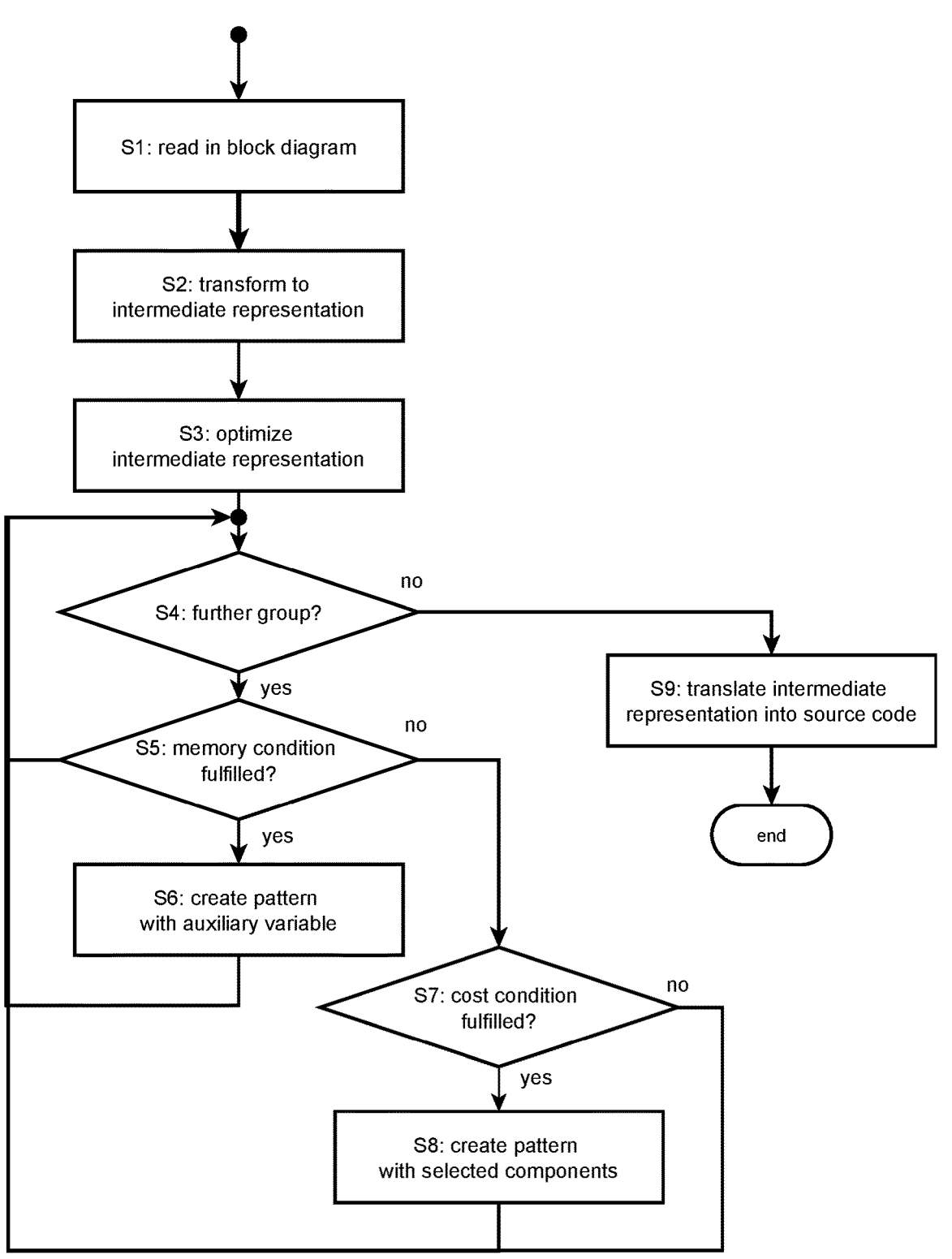
FIG. 3 shows a schematic flowchart of an embodiment of a method according to the invention for generating source code.

FIG. 3 is a schematic flowchart of an embodiment of a method according to the invention for generating source code. The method may be executed entirely by a processor of an example embodiment of the computer system PC; however, it may also be intended for execution in a client-server environment having an operator computer and one or more servers linked over a network, in which case computationally intensive steps may be carried out on the servers.

In step S1 (read in block diagram), a block diagram is input. The block diagram comprises at least two processing blocks linked by signals and may include a multiplicity of further blocks. Expediently, inputting the block diagram also comprises reading out at least one block property and/or relevant settings for generating the code, for example the data type of a variable, from the definition data pool DDT.

In step S2 (Transform into intermediate representation), the selected model is transformed from one or more blocks of the block diagram into an intermediate representation, which preferably comprises one or more hierarchical graphs. These can in particular be data flow graphs, control flow graphs, or a tree structure. In addition to the block diagram, additional information from a definition data pool DDT is also expediently taken into account when generating the intermediate representation and incorporated therein. This may also include situations in which elements are generated on the basis of information in the data definition pool DDT, or in which properties of elements or relevant settings for generating the code, for example the data type of a variable, are extracted from the definition data pool DDT.

In step S3 (optimize intermediate representation), the hierarchical graphs may be optimized in order to reduce the number of variables required and/or the memory consumption, for example stack occupation, and/or the number of operations or processor instructions and/or the execution time of the source code. This optimization may comprise a multiplicity of intermediate steps in which a set of hierarchical graphs may be converted into a different set of changed hierarchical graphs by applying optimization rules. Various strategies may be applied during the optimization, such as constant folding or eliminating dead code. Thus, a plurality of further optimization rules may be applied successively, resulting in more optimized intermediate representations. The optimized intermediate representations may iteratively change from being structurally close to the initial block diagram to a representation whose properties closely resemble source code in a language such C or C++. An optimization according to the invention may preferably be applied to an optimized intermediate representation resembling C-Code. However, it is also possible to apply further optimization rules to optimize the resulting code further with respect to code size, memory consumption and/or execution speed. Thus, prior to step S9 (translate intermediate representation into source code), a further step of applying at least one further optimization rule may be performed.

In step S4 (further groups?), a check is carried out as to whether the block diagram comprises a group of operations suitable for optimization according to the invention. A suitable group can be determined by identifying an assignment of an entire multi-component variable and a subsequent discarding of at least one component of that variable, so that only parts of the multi-component variable are used in further calculations. Such a group of operations can in particular result from transforming block groups of three blocks, a source block emitting a first composite signal comprising a multi-component variable, a passing block receiving the first composite signal and emitting a second composite signal with the same dimensions, as well as a filter block receiving the second composite signal and discarding at least one component of the second composite signal. When a group of operations is identified that allows for restricting the value assignments to parts of the multi-component variable, step S5 is performed next; otherwise the execution continues with step S9.

In step S5 (memory condition fulfilled?), for the current group of operations, a check is carried out as to whether the size of the one or more components that are kept is smaller than a predefined threshold. Alternatively, the dimension of the discarded components may be compared to a predefined threshold. By defining a suitable threshold, optimization according to the invention can be limited to cases where a substantial decrease in memory consumption can be obtained, or it can be applied whenever at least one component of the multi-component variable is discarded subsequent to an assignment of the entire variable. If the memory condition is fulfilled, step S6 is performed next; otherwise, the execution continues with step S7 in order to determine whether an alternative code optimization can be applied.

In step S6 (create pattern with auxiliary variable), a pattern is created that replaces the original group of operations by one or more assignments affecting the remaining components of the multi-component variable by introducing auxiliary variables. The data type of the auxiliary variables corresponds to that of the component or subcomponent subject to the assignment. After creating the pattern and inserting it into the optimized intermediate representation, execution continues at step S4 to determine whether further optimizable groups of operations exist.

In step S7 (cost condition fulfilled?), an estimate of the execution time for partial assignments is compared to a predefined threshold. When the execution time is lower than the threshold, the cost condition is fulfilled. If the cost condition is fulfilled, the execution continues with step S8 (create pattern with selected components), that replaces the assignment of the entire multi-component variable with partial assignments to the remaining one or more components or subcomponents. The execution then continues with step S3 in order to determine whether further optimizable groups exist.

In step S9 (Translate intermediate representation into source code), the optimized intermediate representation or the optimized hierarchical graphs resulting from the entirety of the intermediate steps carried out are translated into source code of a textual programming language, in particular C code or C++. In this step too, a further optimization may be carried out, in particular such that the generated instructions represent a sub-set of the instructions included in principle by the language and/or the generated control structures represent a sub-set of the control structures included in principle by the language. This makes it possible to satisfy precisely defined language rules. Alternatively or additionally, additional information, for example a reference between program rows and a block of the block diagram, may be generated and incorporated into the source code in particular in the form of comments in order to improve the legibility of the source code and/or simplify debugging.

During or after code generation, information on the current block diagram or results of the code generation, for example warnings, may be stored in the definition data pool. This information may be used, for example, to influence compiling of the generated source code, or to provide meta information for other tools, for example calibration information in ASAP2 format or information for generating an intermediate layer in accordance with the AUTOSAR standard. In alternative embodiments of the invention, code in a hardware description language or a configuration of a programmable hardware component may be generated from the block diagram.

Figure 4:
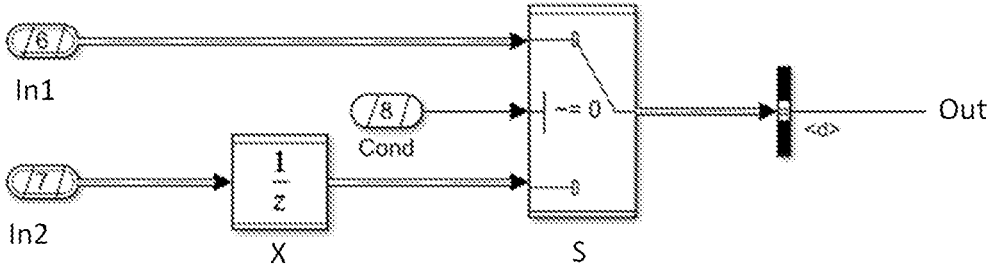
FIG. 4 displays a first example of a block diagram with a composite signal that is processed and filtered.

FIG. 4 shows a first example of a block diagram with a composite signal that is processed and filtered. A first composite signal, more specifically a bus, is emitted by a port block In1 and received by a selection block. A second composite signal, a bus of the same dimension, is emitted by a port block In2 and received by a unit delay block X. The unit delay block X stores the input signal for one time step before emitting it, so that the output corresponds to the input from the previous time step. The signal emitted by the unit delay block is received by the selection block S. A scalar signal is emitted by a port block Cond and received by the selection block S. Based on the input Cond, the selection block S either transmits the first or the second composite signal. The output signal of the selection block S is then received by a bus selector block that selects one component, the component d, of the composite signal.

This figure illustrates common cases where large parts of a multi-component variable, such as a structure, are not used. For example, if the buses belong to one interface and there are criteria for which bus should ultimately be used, then it may be more convenient for a user to connect several buses to a selection block instead of selecting at an early stage.

Without optimization according to the invention, source code comprising the following instructions may be created from the block diagram:

```
if (Cond) {
    S = In1;
} else {
    S = X;
}
Out = S.d;
X = In2; /* store signal value for next time step */
```

10

When the memory condition is fulfilled, a method according to the invention allows for creating optimized source code:

```
if (Cond) {
    Aux_S_d = In1.d;
} else {
    Aux_S_d = Aux_X_d;
}
Out = Aux_S_d;
Aux_X_d = In2.d;
```

In generating the source code, the processor replaced an output variable of the passing block with an auxiliary variable Aux_S_d of smaller dimension; further, it replaced the output variable of at least one block directly upstream of the passing block with an auxiliary variable Aux_X_d of smaller dimension. Because the auxiliary variables Aux_S_d and Aux_X_d only need to contain the remaining component of the composite signal, the memory consumption and the execution time for copying the variables can be reduced.

If the memory condition is not fulfilled, but the cost condition is, the following source code can be generated:

```
if (Cond) {
    S.d = In1.d;
} else {
    S.d = X.d;
}
Out = S.d;
X = In2;
```

In an embodiment of the invention, the source code is further optimized by also tailoring the assignments for the unit delay block as direct neighbor of the selection block:

```
if (Cond) {
    S.d = In1.d;
} else {
    S.d = X.d;
}
Out = S.d;
X.d = In2.d;
```

Breaking up struct assignments into assignments of only the required struct components or their parent substructs allows for reducing execution time as well as increasing readability. Further, it facilitates detecting unnecessary components and thus allows for subsequent optimizations including a later removal of one or more unnecessary components from the multi-component data type.

Figure 5:
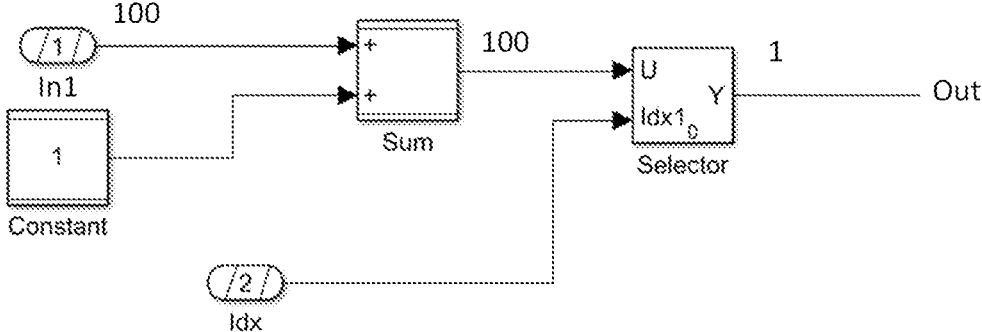
FIG. 5 shows a second example of a block diagram with a composite signal that is processed and filtered.

FIG. 5 shows a second example of a block diagram with a composite signal that is processed and filtered. A first composite signal comprising a vector with 100 elements, is emitted by the port block In1 and received by a sum block Sum. A scalar value is emitted by the constant block Constant and also received by the sum block Sum. The sum block calculates the elementwise addition of the scalar value to the vector and emits a second composite signal comprising a vector with 100 elements. A variable selector block Selector receives the second composite signal. A port block Idx emits a scalar signal that is also received by the variable selector block Selector. Based on the value of the scalar signal, the variable selector block selects one element of the second composite signal and emits it as output signal Out.

Without optimization according to the invention, source code comprising the following instructions may be created from the block diagram:

```
for (i = 0; i < 10; i++) {
        Sum[i] = In1[i] + 1;
}
Selector = Sum[Idx];
```

When the memory condition is fulfilled, a method according to the invention allows for creating optimized source code:

Aux_Sum=In1[Idx]+5;

Selector=Aux_Sum;

If the memory condition is not fulfilled, but the cost condition is, the following source code can be generated:

Sum[Idx]=In[Idx]+5;

Selector=Sum[Idx];

The method according to an embodiment of the invention allows for reductions in storage requirements and the execution time otherwise required for copying, particularly when using multi-component variables having high memory consumption, as occur, for example, when modeling buses.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating source code from one or more blocks of a block diagram, the method comprising:
transforming the block diagram into an intermediate representation, wherein the block diagram comprises at least three blocks, wherein the at least three blocks include a source block emitting a first composite signal corresponding to a multi-component variable, a passing block receiving the first composite signal and emitting a second composite signal with the same dimensions, and a filter block receiving the second composite signal and discarding at least one component of the second composite signal, and wherein transforming the block diagram into the intermediate representation comprises transforming the at least three blocks;
applying at least one optimization to the intermediate representation, wherein applying the at least one optimization comprises:
determining whether a memory condition is fulfilled, wherein determining whether a memory condition is fulfilled comprises: determining whether at least one component discarded in the filter block is of bigger dimension than a first predefined threshold, and determining whether the dimension of the remaining components emitted by the filter block is lower than a second predefined threshold; and
based on the at least one component discarded in the filter block being of bigger dimension than the first predefined threshold or based on the dimension of the remaining components emitted by the filter block being lower than the second predefined threshold the memory condition being fulfilled, replacing an output variable of the passing block with one or more auxiliary variables of smaller dimension; and
translating the optimized intermediate representation into source code.

2. The method of claim 1, wherein the first composite signal is a bus.

3. The method of claim 1, wherein the multi-component variable is a structure comprising multiple components of different data types.

4. The method of claim 1, wherein the multi-component variable is a vector comprising multiple components of the same data type.

5. The method of claim 1, wherein the passing block is a selection block receiving the first composite signal and a third composite signal of the same dimension, wherein the selection block transmits either the first composite signal or the third composite signal.

6. The method of claim 1, wherein the passing block is a calculation block that performs elementwise calculation on the first composite signal.

7. The method of claim 1, wherein the passing block is a delay block that emits received signals after one or more periods.

8. The method of claim 1, wherein applying the at least one optimization further comprises replacing the output variable of at least one block directly upstream of the passing block with one or more auxiliary variables of smaller dimension based on a memory condition being fulfilled.

9. The method of claim 1, further comprising:
compiling the source code for at least one arithmetic logic unit of a control unit to generate an executable code;
transmitting the executable code to the control unit; and
storing the executable code on a non-volatile memory of the control unit and/or executing the executable code by the at least one arithmetic logic unit of the control unit.

10. A method for generating source code from one or more blocks of a block diagram, the method comprising:
transforming the block diagram into an intermediate representation, wherein the block diagram comprises at least three blocks, wherein the at least three blocks include a source block emitting a first composite signal corresponding to a multi-component variable, a passing block receiving the first composite signal and emitting a second composite signal with the same dimensions, and a filter block receiving the second composite signal and discarding at least one component of the second composite signal, and wherein transforming the block diagram into the intermediate representation comprises transforming the at least three blocks; and applying at least one optimization to the intermediate representation, wherein applying the at least one optimization comprises:

determining whether a memory condition is fulfilled;

based on the memory condition not being fulfilled, determining whether a cost condition is fulfilled, wherein the cost condition is fulfilled based on the execution time for the partial assignment being lower than a predefined threshold; and based on the cost condition being fulfilled, replacing an assignment of the entire multi-component variable by a partial assignment pertaining to one or more components of the multi-component variable, wherein replacing an assignment of the entire multi-component variable by a partial assignment pertaining to one or more components of the multi-component variable further comprises replacing an assignment of the entire multi-component variable by a partial assignment pertaining to one or more components of the multi-component variable of at least one block directly upstream of the passing block.

11. A non-transitory computer-readable medium having processor-executable instructions stored thereon for generating source code from one or more blocks of a block diagram, wherein the processor-executable instructions, when executed, facilitate:

transforming the block diagram into an intermediate representation, wherein the block diagram comprises at least three blocks, wherein the at least three blocks include a source block emitting a first composite signal corresponding to a multi-component variable, a passing block receiving the first composite signal and emitting a second composite signal with the same dimensions, and a filter block receiving the second composite signal and discarding at least one component of the second composite signal, and wherein transforming the block diagram into the intermediate representation comprises transforming the at least three blocks;

applying at least one optimization to the intermediate representation, wherein applying the at least one optimization comprises:

determining whether a memory condition is fulfilled, wherein determining whether a memory condition is fulfilled comprises: determining whether at least one component discarded in the filter block is of bigger dimension than a first predefined threshold, and determining whether the dimension of the remaining components emitted by the filter block is lower than a second predefined threshold; and based on the at least one component discarded in the filter block being of bigger dimension than the first predefined threshold or based on the dimension of the remaining components emitted by the filter block being lower than the second predefined threshold the memory condition being fulfilled, replacing an output variable of the passing block with one or more auxiliary variables of smaller dimension; and translating the optimized intermediate representation into source code.

* * * * *